US011556024B2

(12) United States Patent
Tang et al.

(10) Patent No.: US 11,556,024 B2
(45) Date of Patent: Jan. 17, 2023

(54) DISPLAY ASSEMBLY OF ELECTRONIC DEVICE, ELECTRONIC DEVICE, AND METHOD FOR MANUFACTURING DISPLAY ASSEMBLY

(71) Applicant: GUANGDONG OPPO MOBILE TELECOMMUNICATIONS CORP., LTD., Guangdong (CN)

(72) Inventors: Yimei Tang, Guangdong (CN); Jiao Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/116,713

(22) Filed: Dec. 9, 2020

(65) Prior Publication Data
US 2021/0088830 A1 Mar. 25, 2021

Related U.S. Application Data

(63) Continuation of application No. PCT/CN2018/091011, filed on Jun. 13, 2018.

(51) Int. Cl.
*G02F 1/1333* (2006.01)
*F21V 8/00* (2006.01)
(Continued)

(52) U.S. Cl.
CPC ..... *G02F 1/133331* (2021.01); *G02B 6/0068* (2013.01); *G02F 1/1339* (2013.01);
(Continued)

(58) Field of Classification Search
CPC .................................. G02F 1/133512
See application file for complete search history.

(56) References Cited

U.S. PATENT DOCUMENTS 10,267,976 B1 * 4/2019 Zheng ................. G02B 6/0045
2013/0313672 A1 * 11/2013 Min ................. H01L 31/02164
257/434

(Continued)

FOREIGN PATENT DOCUMENTS

CN 106506742 A 3/2017
CN 106850897 A 6/2017
(Continued)

OTHER PUBLICATIONS

Extended European Search Report for EP Application 18922823.2 dated Apr. 14, 2021. (144 pages).
(Continued)

*Primary Examiner* — Edmond C Lau
(74) *Attorney, Agent, or Firm* — Young Basile Hanlon & MacFarlane, P.C.

(57) ABSTRACT

A display assembly of an electronic device, the electronic device, and a method for manufacturing the display assembly are provided. The electronic device includes a display assembly and a camera module. The display assembly includes a cover plate, a display panel, and a backlight module that are sequentially stacked together. The cover plate has a light transmitting region, and the light transmitting region corresponds to a display region of the display panel. The display region of the display panel defines a first mounting through hole. The first mounting through hole is provided with a light blocking layer on a hole wall of the first (Continued)

mounting through hole, and an end of the light blocking layer close to the cover plate is attached to the light transmitting region.

15 Claims, 12 Drawing Sheets

(51) Int. Cl.
  *G02F 1/1335* (2006.01)
  *G02F 1/1339* (2006.01)
  *G02F 1/1368* (2006.01)
  *H04M 1/02* (2006.01)
(52) U.S. Cl.
  CPC ...... *G02F 1/1368* (2013.01); *G02F 1/133314* (2021.01); *G02F 1/133325* (2021.01); *G02F 1/133512* (2013.01); *G02F 1/133514* (2013.01); *H04M 1/0264* (2013.01); *H04M 1/0266* (2013.01)

(56) References Cited

U.S. PATENT DOCUMENTS

| | | | | |
|---|---|---|---|---|
| 2016/0161664 A1* | 6/2016 | Ishida | .................. | G02B 6/0045 359/230 |
| 2019/0072822 A1* | 3/2019 | Yasunaga | .......... | G02F 1/133603 |
| 2019/0278132 A1* | 9/2019 | Nakamura | ........... | G02B 5/3075 |

FOREIGN PATENT DOCUMENTS

| | | |
|---|---|---|
| CN | 106935144 A | 7/2017 |
| CN | 107067971 A | 8/2017 |
| CN | 107144995 A | 9/2017 |
| CN | 107229148 A | 10/2017 |
| CN | 107272269 A | 10/2017 |
| CN | 107331314 A | 11/2017 |
| CN | 107707695 A | 2/2018 |
| CN | 107872611 A | 4/2018 |
| CN | 207264062 U | 4/2018 |
| EP | 3547019 A1 | 10/2019 |
| WO | 2017061312 A1 | 4/2017 |

OTHER PUBLICATIONS

Chinese First Office Action with English Translation for CN Application 201880092663.7 dated Dec. 6, 2021. (15 pages).
International search report with English Translation issued in corresponding international application No. PCT/CN2018/091011 dated Mar. 14, 2019.
Chinese Second Office Action with English Translation for CN Application 201880092663.7 dated Apr. 26, 2022. (12 pages).
Chinese Decision of Refusal with English Translation for CN Application 201880092663.7 dated Aug. 24, 2022. (16 pages).

* cited by examiner

US 11,556,024 B2

DISPLAY ASSEMBLY OF ELECTRONIC DEVICE, ELECTRONIC DEVICE, AND METHOD FOR MANUFACTURING DISPLAY ASSEMBLY

CROSS-REFERENCE TO RELATED APPLICATION(S)

This application is a continuation of International application No. PCT/CN2018/091011, filed on Jun. 13, 2018, the disclosure of which is hereby incorporated by reference in its entirety.

TECHNICAL FIELD

This disclosure relates to the technical field of electronic products, and particularly to a display assembly of an electronic device, an electronic device, and a method for manufacturing a display assembly.

BACKGROUND

Electronic devices with a high screen-to-body ratio may generally have a large display area, so as to provide good experience for users. At present, mainstream manufacturers are conducting research and development to improve the screen-to-body ratio of the electronic device.

SUMMARY

Implementations of the disclosure provide a display assembly of an electronic device, an electronic device, and a method for manufacturing a display assembly.

A display assembly of an electronic device is provided. The electronic device further includes a camera module. The display assembly includes a cover plate, a display panel, and a backlight module that are sequentially stacked together. The cover plate has a light transmitting region, and the light transmitting region corresponds to a display region of the display panel. The display region defines a first mounting through hole. The first mounting through hole is provided with a light blocking layer on a hole wall of the first mounting through hole, and an end of the light blocking layer close to the cover plate is attached to the light transmitting region. The backlight module defines a second mounting through hole aligned with the first mounting through hole. The second mounting through hole is configured to position the camera module.

An electronic device is provided. The electronic device includes a camera module and a display assembly. The display assembly includes a cover plate, a display panel, and a backlight module that are sequentially stacked together. The cover plate has a light transmitting region, and the light transmitting region corresponds to a display region of the display panel. The display region defines a first mounting through hole. The first mounting through hole is provided with a light blocking layer on a hole wall of the first mounting through hole, and an end of the light blocking layer close to the cover plate is attached to the light transmitting region. The backlight module defines a second mounting through hole aligned with the first mounting through hole. The second mounting through hole is configured to position the camera module. The camera module is inserted in the second mounting through hole, enabling external light to pass through the light transmitting region and the first mounting through hole to enter the camera module.

A method for manufacturing a display assembly is provided. The method includes the following. A cover plate, a display panel, and a backlight module are provided, where the cover plate has a light transmitting region and the display panel has a display region, the display region of the display panel defines a first mounting through hole, and the backlight module defines a second mounting through hole. The cover plate is attached to the display panel, to enable that the light transmitting region corresponds to the display region. A light blocking material is coated to a hole wall of the first mounting through hole and the light blocking material is enabled to flow to a surface of the light transmitting region facing the display panel. The backlight module is attached to a surface of the display panel away from the cover plate, and the second mounting through hole is aligned with the first mounting through hole, so as to obtain the display assembly.

BRIEF DESCRIPTION OF THE DRAWINGS

To describe the technical solutions of the implementations more clearly, the following will give a brief description of accompanying drawings used for describing the implementations. Apparently, the accompanying drawings described in the following are merely some implementations. Those of ordinary skill in the art can also obtain other accompanying drawings based on the accompanying drawings described below without creative efforts.

DETAILED DESCRIPTION

Technical solutions in implementations of the disclosure will be described clearly and completely hereinafter with reference to the accompanying drawings in the implementations. Apparently, the described implementations are merely some rather than all implementations. All other implementations obtained by those of ordinary skill in the art based on the implementations without creative efforts shall fall within the protection scope.

A display assembly of an electronic device is provided according to an implementation of the present disclosure. The electronic device includes, but is not limited to, a mobile phone, a tablet computer, a wearable device, or the like. The electronic device further includes a camera module.

Figure 1:
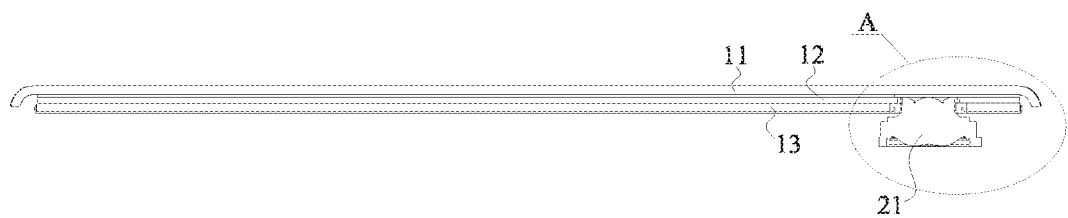
FIG. 1 is a cross-sectional view of a display assembly according to implementations.
Figure 2:
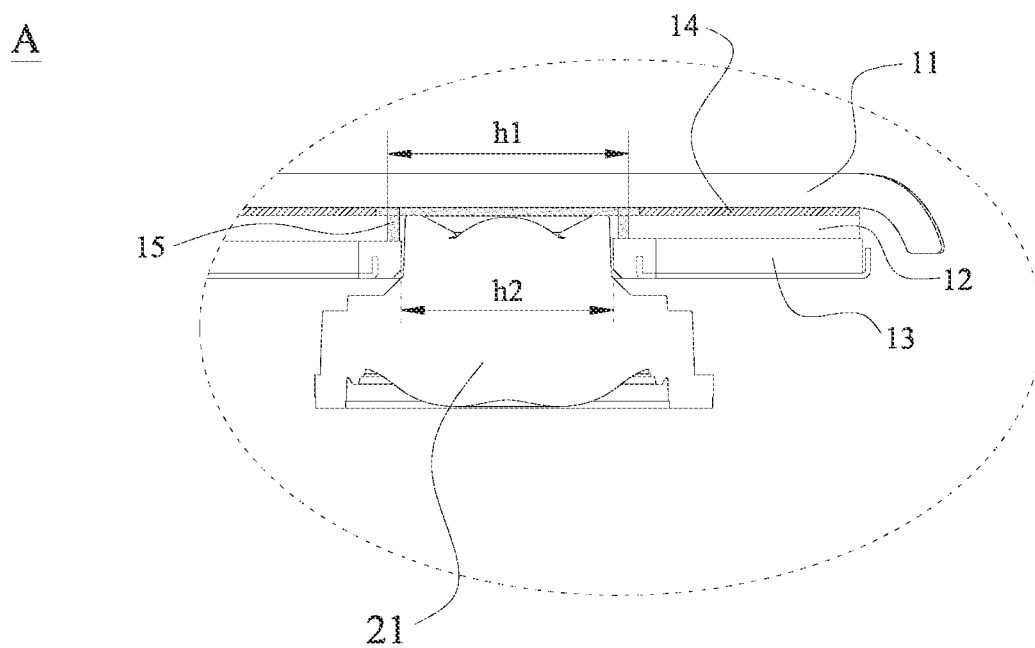
FIG. 2 is an enlarged view of part A of the display assembly illustrated in FIG. 1 according to implementations.

As illustrated in FIG. 1 and FIG. 2, the display assembly 10 includes a cover plate 11, a display panel 12, and a backlight module 13 that are stacked together.

The cover plate 11 is disposed on the display panel 12 to protect the display panel 12. The cover plate 11 can be attached to the display panel 12 via an optical transparent adhesive layer 14. It can be understood that the cover plate 11 and the display panel 12 can be coupled to each other in other manners. The cover plate 11 has a light transmission region. The light transmission region corresponds to a display region of the display panel 12. The corresponding means that positions of the light transmission region and the display region are substantially overlapped and areas of the light transmission region and the display region are substantially equal, so that light from the display region can pass through the light transmission region to form a picture. The cover plate 11 further has an opaque region, and the opaque region is used for shielding other components covered by the cover plate 11, where the other components do not need to be viewed by users.

The display panel 12 is configured to display pictures, and the backlight module 13 is configured to provide backlight for the display panel 12. The display panel 12 has a display region (that is, a region in which pixels are arranged) for picture display, and the display region can allow light to pass through. The display panel 12 further has a non-display region in which circuits, wirings, and the like can be arranged. The display region of the display panel 12 defines a first mounting through hole h1. The first mounting through hole h1 is provided with a light blocking layer 15 on a hole wall of the first mounting through hole h1, to block light from the display panel 12. The light blocking layer 15 may surround all or part of the hole wall of the first mounting through hole h1 in a circumferential direction of the first mounting through hole h1 and/or may be arranged on all or part of the hole wall in an axial direction of the first mounting through hole h1. An end of the light blocking layer 15 close to the cover plate 11 is attached to the light transmitting region, that is, the light blocking layer 15 on the hole wall of the first mounting through hole h1 extends to the light transmitting region. The light blocking layer 15 is made of a light shielding glue material or the like. The light blocking layer 15 can be coated by a coating process.

The backlight module 13 defines a second mounting through hole h2. The second mounting through hole h2 is aligned with the first mounting through hole h1. In one example, the second mounting through hole h2 being aligned with the first mounting through hole h1 refers to that an axis of the second mounting through hole h2 coincides with that of the first mounting through hole h1. Alternatively, the second mounting through hole h2 being aligned with the first mounting through hole h1 refers to that there is a slight deviation between the axis of the second mounting through hole h2 and the axis of the first mounting through hole h1. The second mounting through hole h2 is configured to position a camera module 21. That is, the camera module 21 is inserted in the second mounting through hole h2, and a hole wall of the second mounting through hole h2 cooperates with the camera module 21 to position the camera module 21. The first mounting through hole h1 serves as a channel through which external light can enter the camera module 21. That is, the external light can pass through the light transmitting region, the first mounting through hole h1, and the second mounting through hole h2, and finally enter the camera module 21. The camera module 21 can form an image after collecting the external light.

In the related art, the camera module 21 and the display panel 12 are arranged side by side, and the camera module 21 is arranged at the outside of the display panel 12 (certainly, arranged at the outside of the non-display region of the display panel 12). Under a condition that an area of a display surface (a surface on which pictures are displayed) of the electronic device 20 keeps unchanged, since the camera module 21 occupies part of the display surface, an area of part of the display surface occupied by the display panel 12 is limited, and thus an area of the display region of the display panel 12 is accordingly limited, so that a screen-to-body ratio of the electronic device 20 is relatively small.

In contrast, in the solution provided herein, since the camera module 21 is arranged in a region corresponding to the display region of the display panel 12, the display panel 12 can be extended to a position in which a camera is arranged in the related art, such that a ratio of an area of the display panel 12 to an area of the display surface can be increased, thereby increasing the screen-to-body ratio of the display panel 12. The above is similar to a scenario in which a feature phone is replaced with a smart phone with a touch screen, since the "keyboard" of the smart phone is arranged in the display region of the smart phone (i.e., a key function is realized through touch in the display region), the display panel 12 can be extended to a position in which the keyboard of the feature phone is arranged, such that the screen-to-body ratio of the smart phone is larger than that of the feature phone. In addition, by using the backlight module 13 to position the camera module 21, without a complicated positioning structure, the camera module 21 can be effectively positioned with a component of the display assembly 10. Furthermore, by disposing the light blocking layer 15 on the hole wall of the first mounting through hole h1, the end of the light blocking layer 15 close to the cover plate 11 is attached to the light transmitting region, such that a main light transmission path between the display panel 12 and the camera module 21 may be blocked, and the light from the display panel 12 can hardly enter the camera module 21, thereby avoiding the light from the display panel 12 to interfere with the camera module 21 and ensuring the normal imaging of the camera module 21.

In at least one implementation, as illustrated in FIG. 2, the end of the light blocking layer 15 close to the cover plate 11 may further cover an edge of the first mounting through hole h1. That is, a cross section of the light blocking layer 15 may be T-shaped, which not only increases an adhesion strength of the light blocking layer 15, but also enhances the light blocking effect.

In at least one implementation, as illustrated in FIG. 2, another end of the light blocking layer 15 close to the backlight module 13 can be attached to the backlight module 13. That is, the light blocking layer 15 is arranged on the entire hole wall in the axial direction of the first mounting through hole h1. With such configuration, the display panel 12 is fully separated from the camera module 21 by the cover plate 11, the light blocking layer 15, and the backlight module 13, and thus light from the display panel 12 cannot enter the camera module 21 in any direction.

In at least one implementation, the second mounting through hole h2 has a smaller aperture than the first mounting through hole h1. Therefore, the second mounting through hole h2 can be used for position limiting. In addition, it is beneficial for ensuring that the display panel 12 (as a key component) is far away from the camera module 21 to protect the display panel 12, for example, the display panel 12 can be prevented from being scraped by the camera module 21 during assembly.

Figure 3:
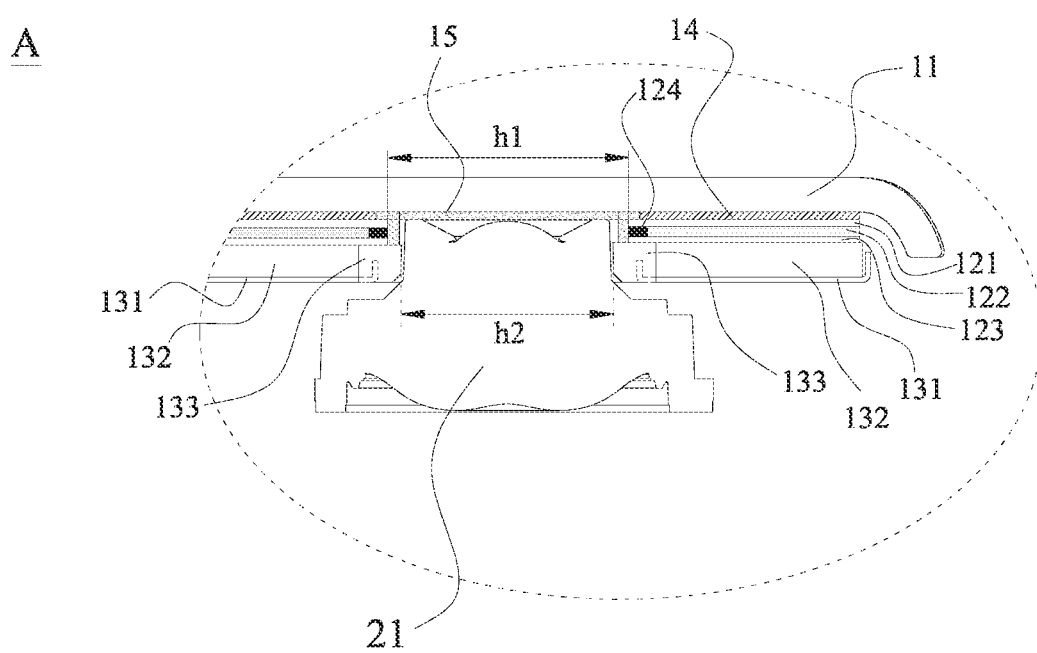
FIG. 3 is an enlarged view of the part A of the display assembly illustrated in FIG. 1 according to other implementations.

In at least one implementation, as illustrated in FIG. 3, the display panel 12 may be a liquid crystal panel. The liquid crystal panel includes a color filter substrate 121, liquid crystal 122, and a thin film transistor (TFT) substrate 123. The first mounting through hole h1 has openings respectively defined on both the color filter substrate 121 and the TFT substrate 123. A sealing tube 124 is disposed between the opening defined on the color filter substrate 121 and the opening defined on the TFT substrate 123, so as to enable the liquid crystal 122 to be sealed in a sealed cavity formed by the color filter substrate 121, the TFT substrate 123, and the sealing tube 124. An inner wall of the sealing tube 124 is used as a hole wall of the first mounting through hole h1. With aid of the sealing tube 124, the liquid crystal 122 is not easy to leak out when the liquid crystal panel defines the through hole, thereby ensuring the display performance. The sealing tube 124 may be formed during manufacturing of the liquid crystal panel.

In at least one implementation, the sealing tube 124 may be a black matrix of the liquid crystal panel. That is to say, the sealing tube 124 is made of a black matrix material (including but not limited to black photoresist film), is manufactured with a black matrix process, and has the function of the black matrix (preventing light leakage among pixels and increasing contrast). It can be understood that in other implementations the display panel 12 is not limited to the liquid crystal panel, and the sealing tube 124 may also be made of other materials and manufactured with other processes.

Figure 4:
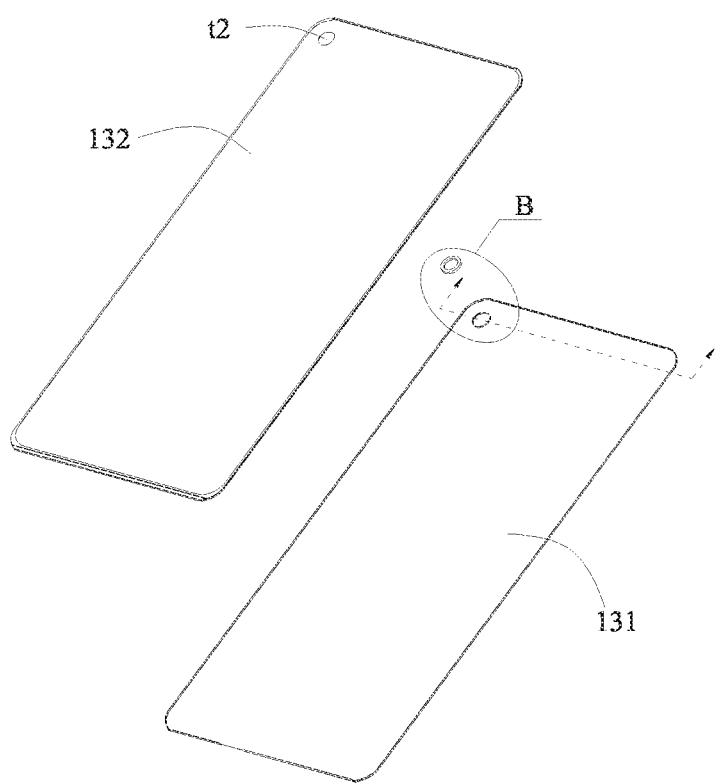
FIG. 4 is an exploded view of a backlight module in FIG. 1.
Figure 5:
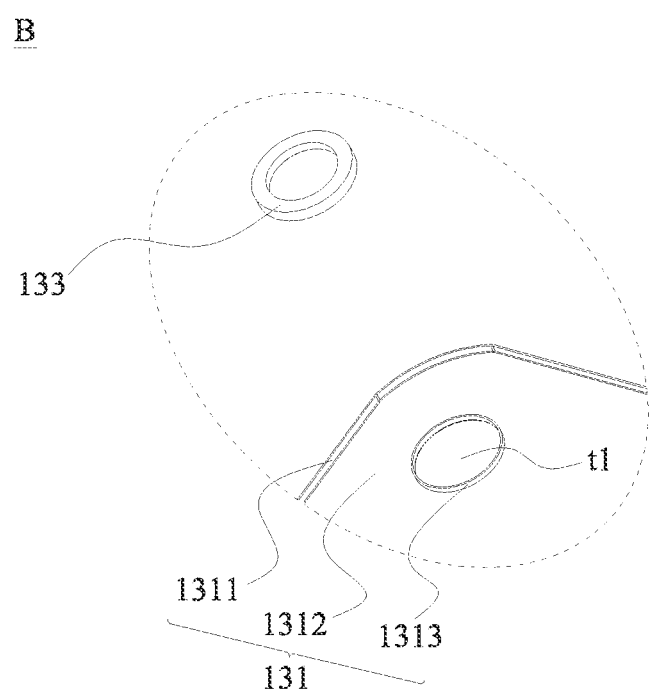
FIG. 5 is an enlarged view of part B of the backlight module in FIG. 4.

In a first implementation, as illustrated in FIG. 3 to FIG. 5, the backlight module 13 may include a metal bottom cover 131. The second mounting through hole h2 has an opening defined on the metal bottom cover 131. A first folded edge 1313 is formed on the periphery of the opening defined on the metal bottom cover 131. The first folded edge 1313 protrudes from (for example, is perpendicular to) a surface in which the opening defined on the metal bottom cover 131 locates. The first folded edge 1313 can be formed by sheet metal processing. Alternatively, the first folded edge 1313 can be separately manufactured and then coupled to the opening defined on the metal bottom cover 131 (by means of a manner including but not limited to riveting or welding). The first folded edge 1313 may be a closed ring to surround the opening defined on the metal bottom cover 131. Alternatively, the first folded edge 1313 may be an open ring coupled to a part of an edge line of the opening defined on the metal bottom cover 131. The first folded edge 1313 serves as the hole wall of the second mounting through hole h2, that is to say, the first folded edge 1313 can be used to position the camera module 21, so as to effectively position the camera module 21 without a complicated positioning structure.

As illustrated in FIG. 3 to FIG. 5, compared with the first implementation, in a second implementation, the backlight module 13 may further include a plastic sleeve 133, and the plastic sleeve 133 is coupled to the first folded edge 1313. The plastic sleeve 133 defines an open hole, and the open hole of the plastic sleeve 133 is aligned with a first through hole t1 (that is, the opening defined on the metal bottom cover 131). The open hole of the plastic sleeve 133 serves as the second mounting through hole h2. In other words, the plastic sleeve 133 can be used to position the camera module 21, thereby realizing the effective positioning of the camera module 21. Since the plastic sleeve 133 is manufactured by a plastic molding process, the plastic sleeve 133 has high size accuracy, which is helpful for reducing the assembly tolerance between the plastic sleeve 133 and the camera module 21 and enhancing the assembly strength of the camera module 21.

According to implementations, the plastic sleeve 133 may be attached to a hole wall of the first through hole t1 to be received in the first through hole t1. In this case, the first folded edge 1313 is arranged at the outside of the plastic sleeve 133. Alternatively, the plastic sleeve 133 can be inserted in and coupled to the first folded edge 1313, that is, the first folded edge 1313 is embedded in a side wall of the plastic sleeve 133 to form a fixed connection between the plastic sleeve 133 and the first folded edge 1313. In this way, the connection strength of the plastic sleeve 133 can be enhanced, thereby facilitating the position limiting of the camera module 21. In addition, the alignment between the open hole of the plastic sleeve 133 and the first through hole t1 has the same meaning as the above-described alignment between the second mounting through hole h2 and the first mounting through hole h1, which will not be repeated herein.

In at least one implementation, as illustrated in FIG. 3 to FIG. 5, the metal bottom cover 131 may include a cover body 1312. A second folded edge 1311 is formed on the periphery of the cover body 1312. The second folded edge 1311 protrudes from (for example, is perpendicular to) the cover body 1312. The second folded edge 1311 can be formed by sheet metal processing. Alternatively, the second folded edge 1311 can be separately manufactured and then coupled to the cover body 1312 (by means of a manner including but not limited to riveting or welding). The second folded edge 1311 may be a closed ring to surround the cover body 1312. Alternatively, the second folded edge 1311 may be an open ring coupled to a part of an edge line of the cover body 1312. The backlight module 13 further includes an optical component(s) 132 (including but not limited to, a light guide plate 1321, a reflective sheet, a filter, an antireflection film, and the like). The optical component 132 is disposed between the cover body 1312 and the display panel 12. The optical component 132 defines a second through hole t2. The first folded edge 1313 is inserted in the second through hole t2. That is, the second through hole t2 has a larger aperture than the first through hole t1, so that a hole wall of the second through hole t2 surrounds the periphery of the first folded edge 1313. The second folded edge 1311 is arranged around the periphery of the optical component 132 to receive and protect the optical component 132.

In at least one implementation, the optical component 132 includes the light guide plate 1321. The light guide plate 1321 is configured to receive light of a light source and provide uniform surface light to the display panel 12.

Figure 6:
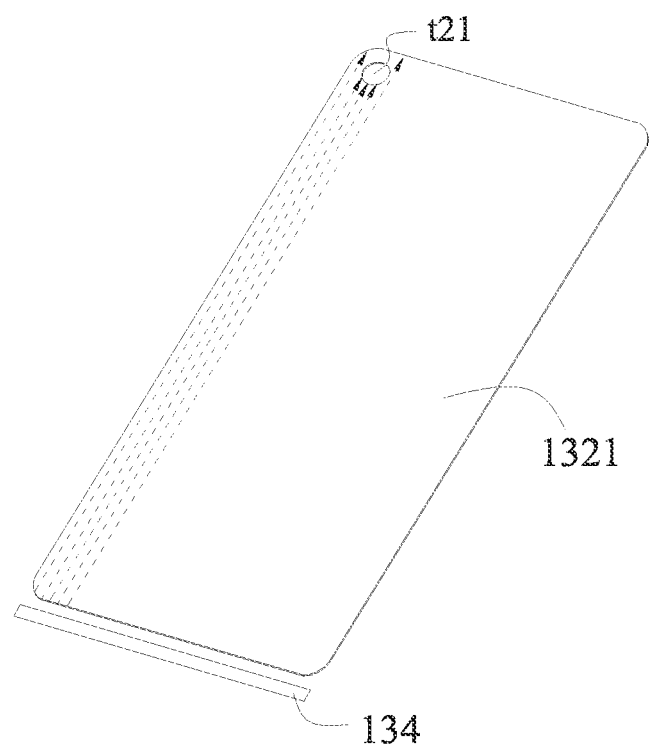
FIG. 6 is a schematic view illustrating a light propagation path in a light guide plate according to implementations.

In at least one implementation, as illustrated in FIG. 4 and FIG. 6, the second through hole t2 has an opening t21 at an edge line of the light guide plate 1321. FIG. 6 is a schematic view illustrating a transmission path of light from the light source 134 in the light guide plate 1321, where a dashed arrow represents incident light paths of the light source 134 (for the purpose of concise illustration, merely some incident light paths of the light source 134 are illustrated), and a light-emitting surface of the light guide plate 1321 is a surface facing an observer. According to implementations, light traveling to one side of the opening t21 cannot be transmitted to the other side of the opening t21 due to lack of a transmission medium. As a result, a surface light cannot be generated at the other side of the opening t21, and thus a corresponding region of the display panel 12 cannot be used for display. However, since the opening t21 of the second through hole t2 defined on the light guide plate 1321 locates at the edge line of the light guide plate 1321, and a region at the other side of the opening t21 where the surface light cannot be generated is extremely small, such that the region of the display panel 12 that cannot be used for display is also extremely small. Therefore, with such configuration, it can avoid the adverse influence of the opening defined on the light guide plate 1321 on the display of the display panel 12 as much as possible.

Figure 7:
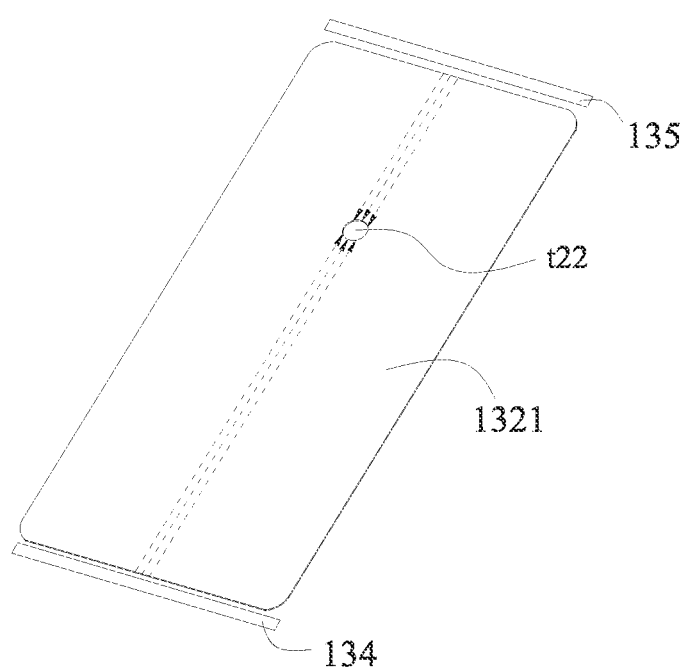
FIG. 7 is a schematic view illustrating a light propagation path in the light guide plate according to other implementations.

Alternatively, different from above implementations, as illustrated in FIG. 7, in another implementation, the backlight module 13 includes a first light source 134 and a second light source 135. The first light source 134 and the second light source 135 are respectively disposed at two opposite sides of an opening t22 of the second through hole t2 defined on the light guide plate 1321, so as to provide incident light to the light guide plate 1321 from opposite directions. The first light source 134 and the second light source 135 can cooperate with each other, so that surface lights can be generated at the two sides of the opening t22 defined on the light guide plate 1321, thereby remedying the defect that the corresponding region of the display panel 12 cannot be used for display in the above implementations. According to this implementation, the opening t22 on the light guide plate 1321 may be defined at any position as required, for example, may also be defined at the edge line of the light guide plate 1321 or may be defined at a middle position of the light guide plate 1321. The second folded edge 1311 is arranged around the periphery of the first light source 134 and the second light source 135, to receive and protect the first light source 134 and the second light source 135.

Figure 8:
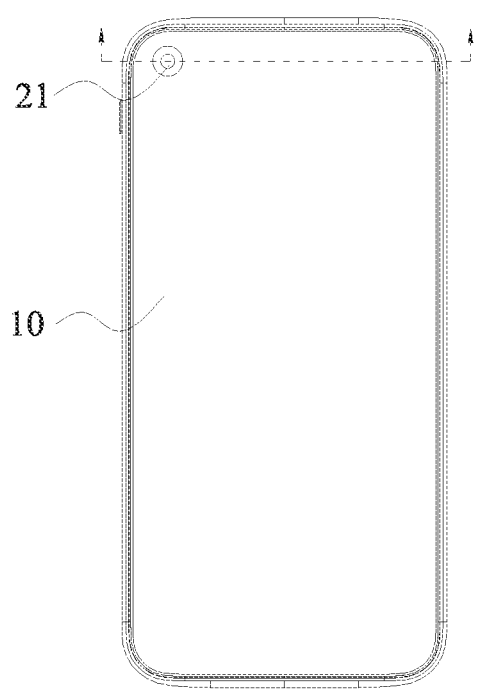
FIG. 8 is a front view of an electronic device according to implementations.
Figure 9:
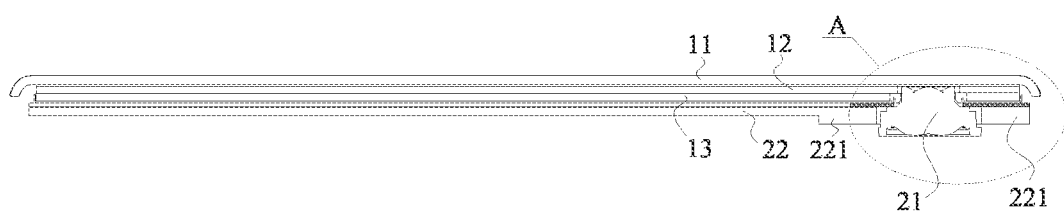
FIG. 9 is a cross-sectional view of the electronic device in FIG. 8.
Figure 10:
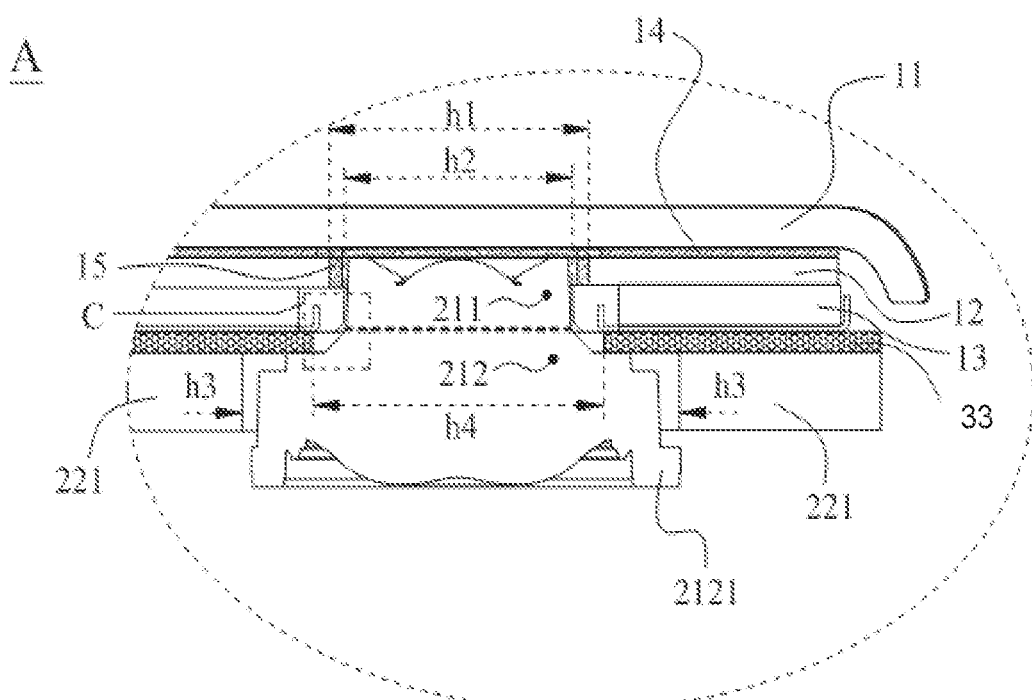
FIG. 10 is an enlarged view of part A of the electronic device in FIG. 9.

As illustrated in FIG. 8 to FIG. 10, the electronic device 20 is further provided according to an implementation of the present disclosure. The electronic device 20 includes the camera module 21 and the display assembly 10. The camera module 21 is inserted in the second mounting through hole h2, enabling external light to pass through the light transmission region and the first mounting through hole h1 to enter the camera module 21. The second mounting through hole h2 is configured to position the camera module 21. As can be seen, the electronic device 20 has a relatively large screen-to-body ratio, which improves the viewing experience. In addition, without a complicated positioning structure, the camera module 21 can be effectively positioned by directly using components of the display assembly 10. Furthermore, it is possible to prevent the light of the display panel 12 from interfering with the camera module 21.

In at least one implementation, as illustrated in FIG. 9 and FIG. 10, the camera module 21 may include a lens base 212 and a lens 211 mounted on the lens base 212. In FIG. 10, to facilitate distinguishing the lens 211 from the lens base 212, a dotted line is drawn in a region in which the camera module 21 is located. The part above the dotted line can be regarded as the lens 211, and the part below the dotted line can be regarded as the lens base 212. A radial size of the lens base 212 is larger than that of the lens 211. The lens 211 is inserted in the second mounting through hole h2, so that the second mounting through hole h2 can position the lens 211. That is, the backlight module 13 is configured to position the lens 211 of the camera module 21. The lens base 212 is clamped at an edge of the second mounting through hole h2.

Figure 11:
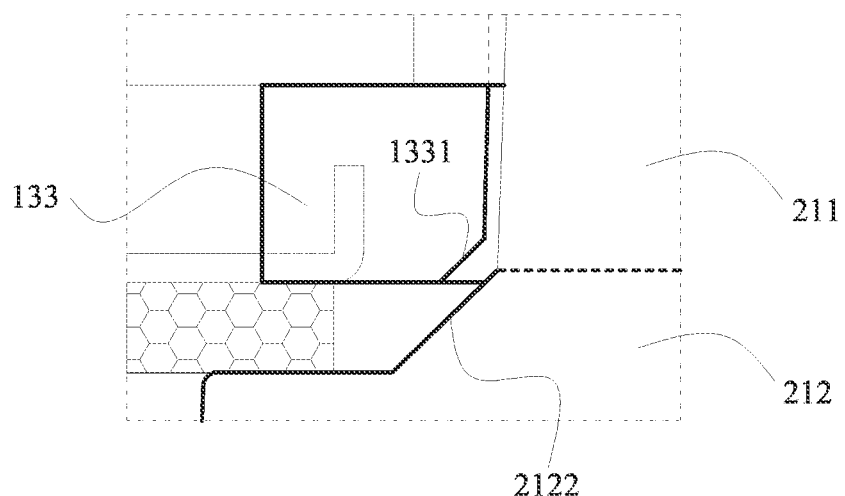
FIG. 11 is an enlarged view of part C of the electronic device in FIG. 10.

In at least one implementation, as illustrated in FIG. 10 and FIG. 11, the plastic sleeve 133 in the backlight module 13 can be used to position the camera module 21. The plastic sleeve 133 has a first guide inclined surface 1331, and a second guide inclined surface 2122 is formed at a position of the lens base 212 coupled to the lens 211. The first guide inclined surface 1331 is opposite to the second guide inclined surface 2122. The two guide inclined surfaces can guide the camera module 21 during mounting the camera module 21 in the plastic sleeve 133.

In at least one implementation, as illustrated in FIG. 9 and FIG. 10, the electronic device 20 further includes a housing 22. The display assembly 10 is disposed on the housing 22. The housing 22 and the display panel 12 are respectively disposed on two opposite surfaces of the backlight module 13. The housing 22 defines a third mounting through hole h3 at a position corresponding to the second mounting through hole h2. The lens base 212 is inserted in the third mounting through hole h3 and clamped at the edge of the second mounting through hole h2. The housing 22 has a suitable structural strength and can well carry the entire display assembly 10. By defining the third mounting through hole h3 on the housing 22 and making the camera module 21 pass through the third mounting through hole h3 to be mounted on the backlight module 13, the overall thickness of the electronic device 20 may be reduced. Furthermore, during mounting the camera module 21 on the backlight module 13, by using the backlight module 13 to position the camera module 21, an assembly size chain of an assembly formed by the camera module 21 and the display assembly 10 may be shortened, thereby reducing the assembly tolerance between the camera module 21 and the display assembly 10 and ensuring the work performance of the camera module 21.

In at least one implementation, as illustrated in FIG. 9 and FIG. 10, a mounting platform 221 protrudes from a surface of the housing 22. The third mounting through hole h3 penetrates through the mounting platform 221. The lens base 212 is provided with a flange 2121 at an end away from the lens 211. The flange 2121 is clamped to the mounting platform 221 so that the flange 2121 can support the lens base 212.

In at least one implementation, as illustrated in FIG. 9 and FIG. 10, a sealing layer 33 is provided between the housing 22 and the backlight module 13. The sealing layer 33 is configured to shield light of the light source in the backlight module 13 and play a role of buffering and vibration absorption. The sealing layer 33 is made of a foam material or the like.

In at least one implementation, as illustrated in FIG. 10, the sealing layer 33 defines a fourth mounting through hole h4 at a position corresponding to the second mounting through hole h2. The fourth mounting through hole h4 is configured to allow the lens 211 to pass through. The periphery of the fourth mounting through hole h4 defined on the sealing layer 33 is clamped between the lens base 212 and the backlight module 13, and this part of the sealing layer 33 has a buffering and vibration absorption function to prevent the lens base 212 from shaking.

Figure 12:
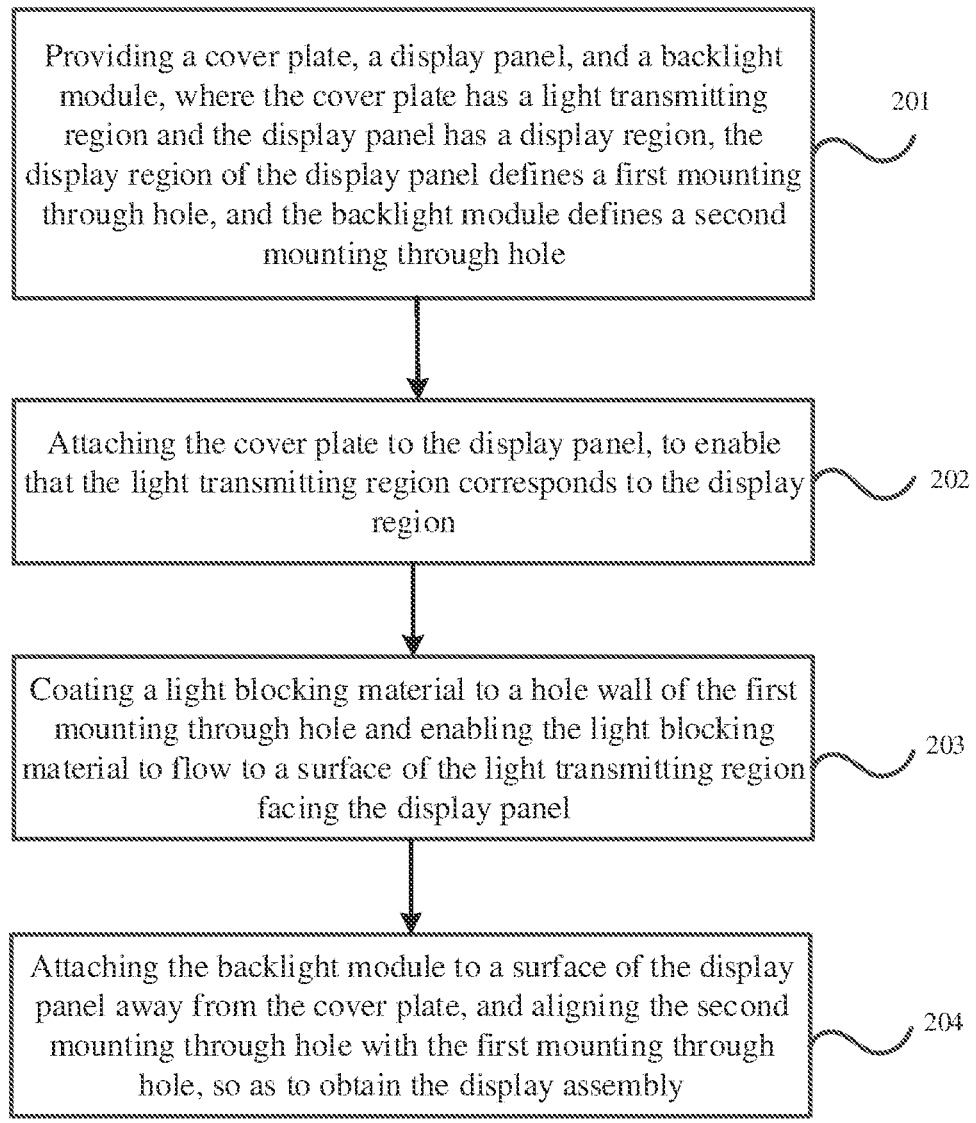
FIG. 12 is a flow chart illustrating a method for a display assembly according to implementations.

As illustrated in FIG. 12, implementations of the disclosure further provide a method for manufacturing a display assembly, which is used to manufacture the display assembly in the above-mentioned implementations. The method begins at 201.

At 201, a cover plate, a display panel, and a backlight module are provided, where the cover plate has a light transmitting region and the display panel has a display region, the display region of the display panel defines a first mounting through hole, and the backlight module defines a second mounting through hole.

At 202, the cover plate is attached to the display panel, to enable that the light transmitting region corresponds to the display region.

At 203, a light blocking material is coated to a hole wall of the first mounting through hole, and the light blocking material is enabled to flow to a surface of the light transmitting region facing the display panel.

At 204, the backlight module is attached to a surface of the display panel away from the cover plate, and the second mounting through hole is aligned with the first mounting through hole, so as to obtain the display assembly.

In one example, areas of the display region and the light transmitting region are substantially equal. The first mounting through hole may be formed during manufacturing of the display panel. For example, if the display panel is a liquid crystal panel, with the manufacturing process of the liquid crystal panel, the first mounting through hole can be defined on the TFT substrate and the color filter substrate, and a sealing tube can be formed between the TFT substrate and the color filter substrate, such that the liquid crystal can be sealed. With a laminating process, the cover plate can be attached to the display panel via an optical transparent adhesive layer, and positions of the light transmitting region and the display region are substantially overlapped, so that the light from the display region can pass through the light transmitting region to form a picture.

In one example, the light blocking material can be coated with a spraying device to form a light blocking layer. The spraying device may include a clamp for clamping an assembly formed by the cover plate and the display panel and a nozzle for spraying the light blocking material. The spraying may be completed when the nozzle moves along a preset spraying path. For example, the assembly formed by the cover plate and the display panel is positioned on the clamp, where the display panel is on the cover plate, to facilitate spraying the light blocking material into the first mounting through hole. In one example, the light blocking material can naturally flow to the surface of the light transmitting region facing the display panel. Alternatively, a tool (including but not limited to an air knife) can be used to enable the light blocking material to flow to the surface of the light transmitting region facing the display panel.

In one example, the backlight module is attached to the surface of the display panel away from the cover plate, so that the second mounting through hole is aligned with the first mounting through hole, so as to obtain the display assembly. In one example, the second mounting through hole being aligned with the first mounting through hole refers to that an axis of the second mounting through hole coincides with that of the first mounting through hole. Alternatively, the second mounting through hole being aligned with the first mounting through hole refers to that there is a slight deviation between the axis of the second mounting through hole and the axis of the first mounting through hole.

The display assembly manufactured according to the method of the implementation has a relatively large screen-to-body ratio. In addition, the camera module can be effectively positioned by directly using components of the display assembly. Furthermore, it is possible to prevent the light of the display panel from interfering with the camera module.

In at least one implementation, in coating the light blocking material to the hole wall of the first mounting through hole, the light blocking material is coated to cover an edge of the first mounting through hole. In this way, the formed light blocking layer may have a T-shaped cross section, which not only increases the adhesion strength of the light blocking layer, but also enhances the light blocking effect.

In at least one implementation, in attaching the backlight module to the surface of the display panel away from the cover plate, the light blocking material is enabled to flow to a surface of the backlight module facing the display panel. In this way, the formed light blocking layer is arranged on the entire hole wall in the axial direction of the first mounting through hole. As a result, the cover plate, the light blocking layer, and the backlight module completely separate the display panel from the camera module, so that the light from the display panel cannot enter the camera module in any direction.

While the disclosure has been described in connection with certain embodiments, it is to be understood that the disclosure is not to be limited to the disclosed embodiments but, on the contrary, is intended to cover various included within the scope of the appended claims, which scope is to be accorded the broadest interpretation so as to encompass all such modifications and equivalent structures as is permitted under the law.

What is claimed is:

1. A display assembly of an electronic device, the electronic device further comprising a camera module, the display assembly comprising:
   a cover plate, a display panel, and a backlight module that are sequentially stacked together, wherein
   the cover plate has a light transmitting region, and the light transmitting region corresponds to a display region of the display panel;
   the display region defines a first mounting through hole, wherein the first mounting through hole is provided with a light blocking layer on a hole wall of the first mounting through hole, and an end of the light blocking layer close to the cover plate is attached to the light transmitting region;
   the backlight module defines a second mounting through hole aligned with the first mounting through hole, wherein the second mounting through hole is configured to position the camera module; and
   the backlight module comprises a metal bottom cover and a plastic sleeve, wherein the metal bottom cover defines a first through hole, and an edge of the first through hole is coupled to a first folded edge, and wherein the plastic sleeve is coupled to the first folded edge, the plastic sleeve defines an open hole aligned with the first through hole, and the open hole of the plastic sleeve is used as the second mounting through hole.

2. The display assembly of claim 1, wherein the end of the light blocking layer close to the cover plate further covers an edge of the first mounting through hole.

3. The display assembly of claim 1, wherein another end of the light blocking layer close to the backlight module is attached to the backlight module.

4. The display assembly of claim 1, wherein
   the display panel is a liquid crystal panel;
   the first mounting through hole has openings respectively defined on both a color filter substrate and a thin film transistor (TFT) substrate of the liquid crystal panel; and
   the display assembly further comprises a sealing tube disposed between the opening defined on the color filter substrate and the opening defined on the TFT substrate, so as to enable liquid crystal to be sealed in a sealed cavity formed by the color filter substrate, the TFT substrate, and the sealing tube, wherein an inner wall of the sealing tube is used as a hole wall of the first mounting through hole.

5. The display assembly of claim 1, wherein the metal bottom cover comprises a cover body, and a second folded edge is formed on the periphery of the cover body, wherein the backlight module further comprises an optical component, and the optical component is disposed between the cover body and the display panel, wherein the optical component defines a second through hole, the first folded edge is inserted in the second through hole, and the second folded edge is arranged around the periphery of the optical component.

6. The display assembly of claim 5, wherein the optical component comprises a light guide plate, and the second through hole has an opening at an edge line of the light guide plate.

7. The display assembly of claim 5, wherein the optical component comprises a light guide plate, and the backlight module further comprises a first light source and a second light source, wherein the first light source and the second light source are respectively arranged at two opposite sides of an opening of the second through hole defined on the light guide plate, so as to provide incident light to the light guide plate from opposite directions, wherein the second folded edge is arranged around the periphery of the first light source and the second light source.

8. The display assembly of claim 1, wherein the first folded edge is embedded in a side wall of the plastic sleeve to form a fixed connection between the plastic sleeve and the first folded edge.

9. A method for manufacturing the display assembly of claim 1, comprising:
providing a cover plate, a display panel, and a backlight module, wherein the cover plate has a light transmitting region and the display panel has a display region, wherein the display region of the display panel defines a first mounting through hole, and the backlight module defines a second mounting through hole, and wherein the second mounting through hole is configured to position a camera module;
attaching the cover plate to the display panel, to enable that the light transmitting region corresponds to the display region;
coating a light blocking material to a hole wall of the first mounting through hole and enabling the light blocking material to flow to a surface of the light transmitting region facing the display panel; and
attaching the backlight module to a surface of the display panel away from the cover plate, and aligning the second mounting through hole with the first mounting through hole, so as to obtain the display assembly,
wherein the backlight module comprises a metal bottom cover and a plastic sleeve, wherein the metal bottom cover defines a first through hole, and an edge of the first through hole is coupled to a first folded edge, and wherein the plastic sleeve is coupled to the first folded edge, the plastic sleeve defines an open hole aligned with the first through hole, and the open hole of the plastic sleeve is used as the second mounting through hole.

10. The method of claim 9, wherein in coating the light blocking material to the hole wall of the first mounting through hole, the light blocking material is coated to cover an edge of the first mounting through hole.

11. The method of claim 9, wherein in attaching the backlight module to the surface of the display panel away from the cover plate, the light blocking material is enabled to flow to a surface of the backlight module facing the display panel.

12. An electronic device, comprising:
a camera module; and
a display assembly, wherein
the display assembly comprises a cover plate, a display panel, and a backlight module that are sequentially stacked together, wherein the cover plate has a light transmitting region, and the light transmitting region corresponds to a display region of the display panel, wherein the display region defines a first mounting through hole, wherein the first mounting through hole is provided with a light blocking layer on a hole wall of the first mounting through hole, and an end of the light blocking layer close to the cover plate is attached to the light transmitting region, wherein the backlight module defines a second mounting through hole aligned with the first mounting through hole, wherein the second mounting through hole is configured to position the camera module;
the camera module is inserted in the second mounting through hole, enabling external light to pass through the light transmitting region and the first mounting through hole to enter the camera module;
the camera module comprises a lens base and a lens mounted on the lens base, wherein the lens is inserted in the second mounting through hole, such that the second mounting through hole positions the lens, wherein the lens base is clamped at an edge of the second mounting through hole;
the electronic device further comprises a housing, wherein the display assembly is disposed on the housing, wherein the housing defines a third mounting through hole at a position corresponding to the second mounting through hole, wherein the lens base is inserted in the third mounting through hole and clamped at the edge of the second mounting through hole; and
a mounting platform protrudes from a surface of the housing, and the third mounting through hole penetrates through the mounting platform, wherein the lens base is provided with a flange at an end away from the lens, wherein the flange is clamped to the mounting platform.

13. The electronic device of claim 12, wherein the backlight module comprises a plastic sleeve, the plastic sleeve has a first guide inclined surface, and a second guide inclined surface is formed at a position of the lens base coupled to the lens, wherein the first guide inclined surface is opposite to the second guide inclined surface.

14. The electronic device of claim 12, wherein a sealing layer is provided between the housing and the backlight module.

15. The electronic device of claim 14, wherein the sealing layer defines a fourth mounting through hole at a position corresponding to the second mounting through hole, wherein the fourth mounting through hole is configured to allow the lens to pass through, and the periphery of the fourth mounting through hole defined on the sealing layer is clamped between the lens base and the backlight module.

* * * * *